(No Model.)

E. TAKKEN.
RUNNING GEAR FOR VEHICLES.

No. 430,356. Patented June 17, 1890.

WITNESSES:
H. Walker
Wm W. Ouyster

INVENTOR:
E. Takken
BY Munn & Co.
ATTORNEYS.

UNITED STATES PATENT OFFICE.

EVERT TAKKEN, OF DOUGLAS, MICHIGAN.

RUNNING-GEAR FOR VEHICLES.

SPECIFICATION forming part of Letters Patent No. 430,356, dated June 17, 1890.

Application filed October 21, 1889. Serial No. 327,670. (No model.)

*To all whom it may concern:*

Be it known that I, EVERT TAKKEN, of Douglas, in the county of Allegan and State of Michigan, have invented a new and useful Improvement in Running-Gears for Vehicles, of which the following is a full, clear, and exact description.

My improvement relates to an improvement in running-gears for vehicles, and especially to the construction of the forward axle of buggies and attachments thereto.

The object of the invention is to provide a means whereby a light, durable, and economical axle is obtained, and likewise a light and effective form of spring; and a further object of the invention is to provide a simple device, capable of attachment to the spring and vehicle-body, whereby the axle may be readily turned beneath the body and with but little friction.

The invention consists in the novel construction and combination of the several parts, as will be hereinafter set forth, and pointed out in the claims.

Reference is to be had to the accompanying drawings, forming a part of this specification, in which similar figures of reference indicate corresponding parts in all the views.

Figure 1:
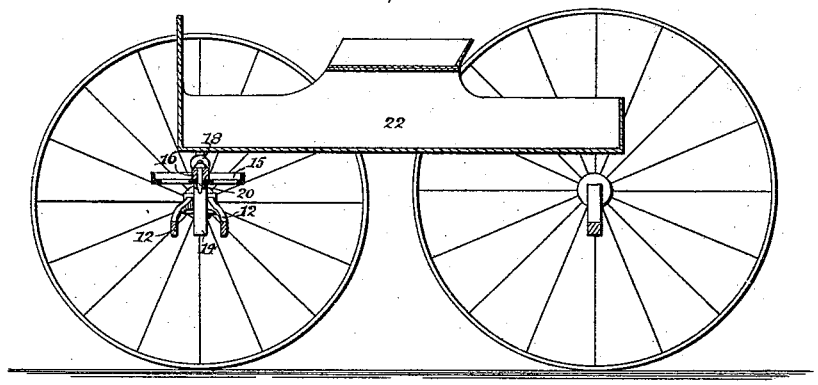
Figure 2:
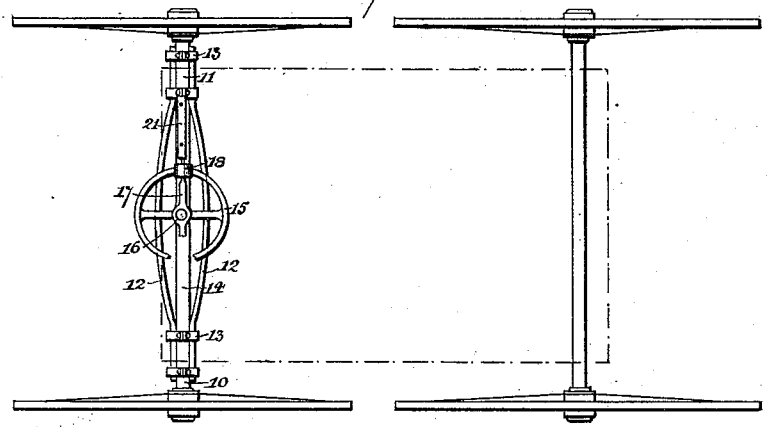

Figure 1 is a central vertical section through a light vehicle or buggy and the axle thereof, the forward axle having my improvement applied. Fig. 2 is a plan view of the forward axle, parts being broken out, and the position of the vehicle being shown in dotted lines; and Fig. 3 is a front elevation of the forward axle and vehicle-body, a portion of the axle attachments being in section.

The forward axle is constructed in two stub-sections 10 and 11, upon which the forward wheels are respectively mounted. These stub-sections of the axle are united by two preferably downwardly-curved bars 12, one bar engaging with each side of the said stub-sections, being rigidly secured thereto by means of clips 13, or equivalent fastening devices.

Figure 3:
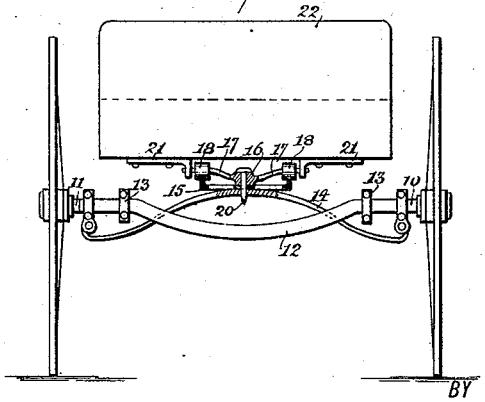

In connection with the forward axle thus constructed an upwardly-bowed spring 14 is employed, the body of which spring is passed between the connecting-bars 12, as best illustrated in Fig. 3, and the extremities of the said spring are clipped or otherwise attached to the under surface of the stub-sections of the axle. Upon the upper surface of the spring 14 a single fifth-wheel 15 is secured, and upon the central portion of the said wheel a disk or plate 16 is held to revolve, provided at two opposite sides with an upwardly-curved arm 17, each arm being provided with a friction-roller 18, adapted to travel upon the upper surface of the fifth-wheel, as best illustrated in Figs. 2 and 3. The disk or plate 16 is held in position by means of a king bolt or pin 20, which is passed through the disk, and likewise through the center of the fifth-wheel and the spring. The ends of the arms 17 are secured to brackets 21, which brackets are rigidly attached to the under surface of the vehicle-body 22 at or near the front portion of the same. The front and rear axles may be connected by any suitable form of reach.

It will be readily observed that the axle is both strong and light, that the spring is of simple construction, and that the devices carried by the spring and attached to the vehicle-body permit of the axle being turned under the body of the vehicle with the least possible friction.

I also desire it to be understood that although I have illustrated the ordinary form of rear axle, said axle is preferably constructed in a similar manner to the front axle, the fifth-wheel being omitted, and that the fifth-wheel of the forward axle may be made solid instead of spoked, and that any number of friction-wheels 18 may be employed to contact with the fifth-wheel.

Having thus described my invention, I claim as new and desire to secure by Letters Patent—

1. The combination, with stub-axles and bars uniting the same, of a spring secured at its extremities to the said stub-axles and bowed upward between the connecting-bars, substantially as shown and described.

2. An axle for vehicles, comprising two stub-sections upon which the wheels are mounted, and downwardly and outwardly curved bars connecting the said stub-sections, substantially as and for the purpose specified.

3. The combination, with stub-axles and downwardly-curved parallel bars uniting said axles, of a spring connected at its extremities to said stub-axles, a fifth-wheel secured to the spring, and a vehicle-body supported by friction-wheels upon said fifth-wheel, substantially as specified.

4. The combination, with stub-axles and downwardly-curved parallel bars uniting the said axles, of a spring connected at its extremities to the said stub-axles and bowed upward between the connecting-bars, a fifth-wheel secured to the spring, a vehicle-body, a disk provided with curved arms secured to the power portion of the body, friction-rollers mounted upon the arms of the disk, contacting with the fifth-wheel, and means, substantially as shown and described, for pivoting the disk upon the fifth-wheel and spring, substantially as specified.

EVERT TAKKEN.

Witnesses:
   THOMAS B. DUTCHER,
   MARTIN GRAY.